(Model.)
P. GLEICH & H. S. KRAUSE.
HOSE COUPLING.
No. 387,226.        Patented Aug. 7, 1888.
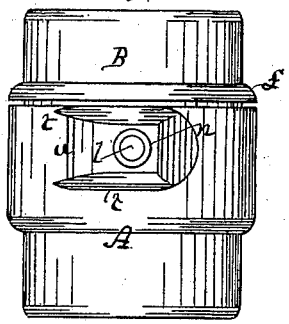
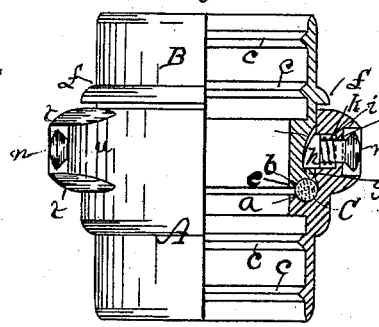
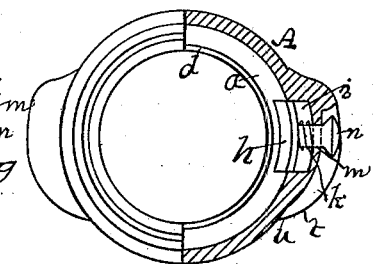
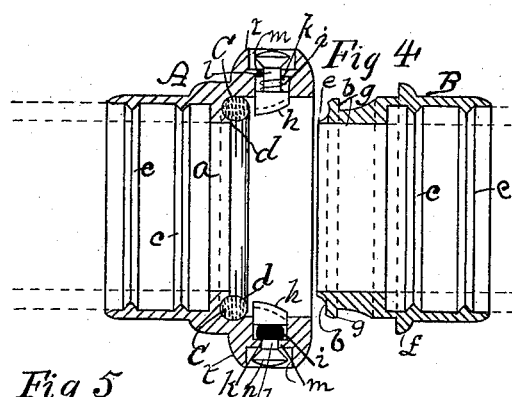
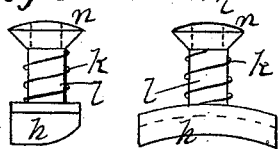
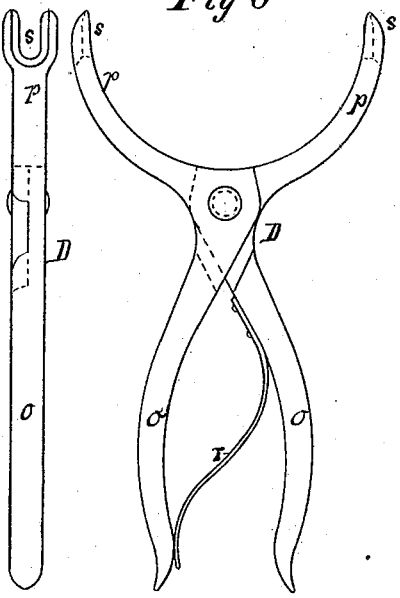
Witnesses
Louis Feeser Jr.
J. S. Brown.
Inventors,
Philip Gleich.
Horatio S. Krause.
Attorneys,
Louis Feeser & Co.
N. PETERS, Photo-Lithographer, Washington, D. C.

UNITED STATES PATENT OFFICE.

PHILIP GLEICH AND HORATIO SEYMOUR KRAUSE, OF ST. PAUL, MINNESOTA.

HOSE-COUPLING.

SPECIFICATION forming part of Letters Patent No. 387,226, dated August 7, 1888.

Application filed October 13, 1886. Serial No. 216,158. (Model.)

*To all whom it may concern:*

Be it known that we, PHILIP GLEICH and HORATIO SEYMOUR KRAUSE, citizens of the United States, residing at St. Paul, in the county of Ramsey and State of Minnesota, have invented Improvements in Hose-Couplings; and we do hereby declare that the following is a full and exact description thereof, reference being had to the accompanying drawings, making part of this specification.

The main purposes designed to be effected by our invention are shortness and compactness of the parts composing it, lightness of the same, smoothness of the outside, and freedom from abrupt projections on the same; freedom from obstructions and projections on the inner surface of the coupling, and clearness and sufficient size of the water-way through the same; simplicity and cheapness of construction, strength and durability of the parts, convenience and ease of coupling and uncoupling, perfection of the packing-joints between the parts, complete housing of the projecting parts necessary for coupling, and protection thereof from violence and injury in handling the hose. The means by which we so fully accomplish these purposes will be set forth in the following description of the construction and operation of the hose-coupling, and clearly defined in the claims.

In the accompanying drawings, Figure 1 represents a side view of the two parts of our improved hose-coupling coupled together; Fig. 2, a half side view and half longitudinal axial section of the same, the view being taken at right angles to that in Fig. 1; Fig. 3, a half end view and half transverse section of the same, the section being taken in a plane indicated by the line 1 1, Fig. 1; Fig. 4, a longitudinal axial section of the two parts of the coupling separated, but in line with each other; Fig. 5, two views, at right angles to each other, of one of the catch-blocks which couple the two parts together and of the lift-pin projecting therefrom; Fig. 6, two views, at right angles to each other, of the tongs employed for raising the lift-pin for uncoupling the parts.

Like letters designate corresponding parts in all of the figures.

In the drawings, A represents the female shell or part of the coupling, and B the male shell or part. The female shell A has a complete annular flange, $a$, on its interior surface, upon the outer face of which is seated the packing-gasket C, and the male shell B has also a flange, $b$, on its interior surface, the outer surface of which fits and presses against the gasket when the parts are coupled together. The inner surfaces of these two flanges are cylindrical and of the same diameter, which is also the same as the interior surface of the hose attached to the shells, as indicated by the dotted lines in Fig. 4, representing the ends of the two parts of the hose, to which the shells are attached around the outer surfaces thereof. There is no projection or unevenness whatever inside of these flanges, or reaching from any portion of the interior surface of either shell within the water-way bounded by the flanges and the inner surface of the parts of the hose. Thus the freedom from any obstruction of the water-way is perfect, and the way is as smooth and regular within the coupling as in the hose itself. The inner edges of the two flanges $a$ $b$ abut against the ends of the inserted parts of the hose, as shown in Fig. 4. Suitable interior ribs or annular projections, $c$ $c$, may be formed on the inner surface of the shells, where they receive the ends of the hose, to assist in retaining the hose therein.

The gasket C is made in the form of a ring of india-rubber or equivalent material, most properly of cylindrical or round form in cross-section, as shown. The gasket-seat on the flange $a$ of the female shell is not only coved to receive the gasket fitting therein, but the coving is enlarged outward into the wall of the shell to a somewhat larger diameter than the inner surface of the mouth of the shell, as shown in Figs. 2 and 4, and the gasket is made large enough to spring outward and fill the same when placed in position, so that it is held securely in place at all times, even when the hose is uncoupled. The coving of the gasket-seat in the flange $a$ produces a lip, $d$, inside of the same, which partially covers the gasket from the interior of the coupling, and a similar lip, $e$, is formed inside of the coving of the flange $b$ of the male shell to also partially cover the gasket from the interior coupling. Thus the two lips $d$ and $e$ together nearly or quite shield the gasket from the interior of the shell when coupled together, as shown in Fig. 2, preferably entirely so, whereby sand and dirt are excluded from the packing-joint when the water is foul. This coving in the interior lip of the male shell contracts the entering end thereof, so that it is readily and easily inserted into the mouth of the female shell. The flange $a$ of the female shell is as narrow as may be, to give sufficient strength to the coved gasket-seat, so that this part of the coupling has as little length as practicable, composed wholly of the portion which admits the end of the hose, this narrow flange $a$, and the coupling portion which receives the gasket and overlaps the corresponding portion of the male shell. The flange $b$ of the male shell is entirely within the portion which enters the female shell in coupling, so that the male part also is as short as practicable, having only the necessary portion to enter the female shell in coupling and the necessary portion to receive the hose, and even these two portions overlap somewhat, as shown, one portion being interior and the other portion being exterior. At the extremity of the entering portion of the male shell there is an exterior flange or bead, $f$, to limit the extent to which the shell may be inserted in the female shell and to prevent any undue wrenching of the coupling by lateral violence upon one of the parts. This flange, being close to the end of the female shell when the parts are coupled together, is not in the way, and adds no abrupt projection to the outside of the coupling, and, besides, being rounded, it serves as a protection to the end of the female shell against violence. The reduction in the length and diameter of the coupling renders it less liable to twist or kink the hose.

The means for securing the two parts of the coupling together are entirely applied to the overlapping parts of the coupling, and do not disturb nor affect the water-way within at all. These means consist of an annular catch-flange, $g$, on the outer side of the entering portion of the male shell B, near the inner extremity of the shell, and of two spring-catches or catch-blocks, $h\ h$, located in cavities $i\ i$ in the inner side of the overlapping portion of the female shell. These two catch-blocks are located on opposite sides of the center of the coupling, and the catch-flange, being annular and entire, allows the catch-blocks to take hold of it at any part of its circumference, so that no care is required in bringing the two shells together. The outer edge of the catch-flange and the inner edges of the two catch-blocks are of course abrupt, in order to hold one upon the other, and the opposite edges thereof are chamfered or rounded, so that the catch-blocks will automatically ride over the catch-flange, when the two parts of the coupling are brought together, by simply pushing one into the other, the springs $k\ k$, outside of the catch-blocks, yielding for the purpose, and then causing the catch-blocks to hold over the catch-flange. We employ short coiled springs for this purpose and mount them on the lift-pins $l\ l$, which project from the catch-blocks out through holes $m\ m$ in the wall of the female shell.

Since one of the purposes of our invention is durability and the utmost exemption from disarrangement in the use of the coupling, we form the lift-pins $l\ l$ integral with their respective catch-blocks, so that they may never become separated, and after the pins are projected outward through the holes $m\ m$ of the shell and the catch-blocks are placed in their cavities in the shell with the springs in place the heads $n\ n$ of the lift-pins, at first made separate from the lift-pins, as shown in Fig. 5, are riveted securely upon the ends of the pins. These heads not only serve to lift the pins by, but also limit the extent to which the catch-blocks may move inward and prevent their falling out of the cavities in which they fit and play.

For the purpose of lifting the two catch-blocks simultaneously in opposite directions to disengage them from the catch-flange $g$ for uncoupling the hose, we employ an instrument or "tongs," D, of the peculiar construction shown in Fig. 6, used in connection with the lift-pin heads $n\ n$, which are beveled on their inner shoulders, as shown, for the purpose. The two parts of the tongs do not cross each other, but are knee-shaped, as shown, so that on bringing the handles $o\ o$ toward each other the jaws $p\ p$ are separated, and vice versa, and a spring, $r$, between the handles holds the handles separated and the jaws approximated to their extreme limits. The jaws are notched or forked at $s\ s$ sufficiently to embrace the bodies of the lift-pins $l\ l$ and hold under the heads $n\ n$ thereof, and the outer edges around the opening of the forks are chamfered or beveled, as shown, so as to fit under the beveled heads of the lift-pins, and these beveled edges of the tongs-forks also preferably increase in thickness, wedge-like, as the forks are inserted endwise under the heads of the lift-pins, so as to enter without failure under the heads and lift them slightly, if necessary, while inserting the tongs in place. Then, on pressing the handles of the tongs toward each other, the lift-pins are simultaneously lifted, thereby disengaging the catch-blocks from the catch-flange and allowing the hose to be freely uncoupled.

Around the heads $n\ n$ of the lift-pins we form bosses $t\ t$ on the opposite sides of the female shell A of sufficient height to house the pin-heads and protect them from violence, as shown. These bosses not only serve as housings for the pin-heads, but as sure guides for inserting the jaws of the tongs under the pin-heads. For this purpose the housings extend only on three sides around the pin-heads, leaving one side, $u$, of each open to admit the jaws of the tongs, as shown in Figs. 1 and 2. The open side of each housing is in the peripheral direction, or transverse to the axial line of the coupling, and those of the two housings point in the same direction, to receive the jaws of the tongs at the same time, and the mouths or openings of the housings are somewhat flaring, as shown, in order to admit the jaws of the tongs freely and then guide them exactly to the lift-pins.

The outer edges of the housings are rounded off, so as to offer no abrupt surfaces, and these are the only projections beyond the general surface of the coupling. Thus the coupling is made as thin as possible in every part and as light as practicable. In fact, because of this general thinness of the shells and of their extreme shortness, as before set forth, together with their freedom from any considerable projections, the coupling is by far the lightest of any with which we are acquainted; and since we prefer to make every part and piece of the coupling of brass, which is a comparatively expensive material, the saving in cost from the extreme lightness of the coupling is important, so much so that we are thereby enabled to use this superior material, not subject to corrosion, and rendering the whole coupling extraordinarily durable without increasing the cost of the same.

The thinness and exterior smoothness of the shells and freedom from exterior projections and sharp-edged surfaces render the coupling little troublesome to handle and almost entirely obviate any injury to the hose with which they may come in contact.

Instead of coiled springs $k\,k$ around the lift-pins $l\,l$ outside of the catch-blocks $h\,h$, we prefer in many cases, especially for winter use, to use soft-rubber springs or blocks, as shown in the lower side of the coupling in Fig. 4. This not only serves as a spring, answering the same purpose as a coiled or other simple spring, but the additional purpose of a packing inside of the hole in the shell to prevent the admission of water, which by freezing would render it difficult or impossible to uncouple the hose until the ice could be thawed out.

We claim as our invention—

1. In a hose-coupling formed of male and female shells, the combination of the female shell A, adapted to receive the end of a hose-pipe inside of the same, having an inwardly-projecting flange, $a$, of equal interior diameter to that of the hose-pipe inserted therein, the said flange having a coved packing-seat retaining the packing-ring C therein, the said female shell also having in its overlapping part inwardly-springing catch-blocks $h\,h$, with their outer ends housed in projections of the shell, as set forth, the packing-ring C, and the male shell B, also adapted to receive the end of a hose-pipe inside of the same, and having an inwardly-projecting flange, $b$, of equal interior diameter to that of the hose-pipe, inserted therein, the said flange extending to the inner end of the shell and having a coved packing-seat at its inner end, adapted to fit against the packing-ring when the shells are coupled together, the said male shell also having a catch-flange, $g$, around the exterior periphery of its insertible portion, adapted to receive the said catch-blocks of the female shell, all as and for the purpose herein set forth.

2. The combination of the lift-pins $l\,l$, housings $t\,t$, having flared open sides $u\,u$, and the forked lifting-tongs D, adapted to enter the said open sides of the housings and to be guided thereby to the said lifting-pins, substantially as and for the purpose herein set forth.

In testimony whereof we have hereunto set our hands in the presence of two subscribing witnesses.

PHILIP GLEICH.
HORATIO SEYMOUR KRAUSE.

Witnesses:
LOUIS FEESER, Jr.,
W. J. RODGERS.